(12) United States Patent
Nogawa

(10) Patent No.: US 7,949,003 B2
(45) Date of Patent: May 24, 2011

(54) IMAGE FORMATION DEVICE, MANAGEMENT DEVICE, NETWORK SYSTEM, CONTROL PROGRAM FOR IMAGE FORMATION DEVICE, AND CONTROL PROGRAM FOR MANAGEMENT DEVICE

(75) Inventor: Hideki Nogawa, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1037 days.

(21) Appl. No.: 11/502,431

(22) Filed: Aug. 11, 2006

(65) Prior Publication Data

US 2007/0058550 A1 Mar. 15, 2007

(30) Foreign Application Priority Data

Aug. 12, 2005 (JP) .................................. 2005-234679

(51) Int. Cl.
*H04L 12/28* (2006.01)
(52) U.S. Cl. ........................ 370/419; 370/389; 370/463
(58) Field of Classification Search .................. 370/236, 370/389, 419, 463
See application file for complete search history.

(56) References Cited

U.S. PATENT DOCUMENTS

| | | | | |
|---|---|---|---|---|
| 6,115,376 | A * | 9/2000 | Sherer et al. .................. | 370/389 |
| 6,208,616 | B1 | 3/2001 | Mahalingam et al. | |
| 6,256,322 | B1 | 7/2001 | Wilson, Jr. | |
| 7,266,818 | B2 * | 9/2007 | Pike et al. ..................... | 717/176 |
| 7,511,839 | B2 * | 3/2009 | Shoji et al. ................... | 358/1.15 |
| 2004/0098506 | A1 * | 5/2004 | Jean .............................. | 709/245 |
| 2004/0151189 | A1 | 8/2004 | Ohkita | |

FOREIGN PATENT DOCUMENTS

| | | |
|---|---|---|
| EP | 0 991 229 A2 | 4/2000 |
| JP | 8-36475 | 2/1996 |
| JP | 8-314651 | 11/1996 |
| JP | 2000-78342 | 3/2000 |
| JP | 2004-222263 A | 8/2004 |

OTHER PUBLICATIONS

Japanese Notification of Reasons of Rejection, w/ English translation thereof, issued in Japanese Patent Application No. JP 2005-234679 dated Feb. 27, 2009.
Extended European Search Report issued in corresponding European Patent Application No. EP 06 25 4213, dated Oct. 23, 2006.

\* cited by examiner

*Primary Examiner* — Derrick W Ferris
*Assistant Examiner* — Christopher R Crompton
(74) *Attorney, Agent, or Firm* — Scully, Scott, Murphy & Presser, P.C.

(57) ABSTRACT

A management device is connected to image formation devices, each having at least one network interface, via a network. Embodiments include a presence check request transmitting unit which transmits presence check requests to the network interfaces of the image formation devices via the network; an identification information receiving unit which receives response information returned from the network interfaces in response to the presence check requests; a combined identification information equivalence judgment unit which makes a judgment on equivalence of multiple pieces of combined identification information when multiple pieces of combined identification information (each generated by combining multiple pieces of identification information assigned to two or more network interfaces) are received from two or more network interfaces as the response information; and a management unit which manages network interfaces whose combined identification information is judged to be equivalent, as network interfaces belonging to the same image formation device.

18 Claims, 14 Drawing Sheets

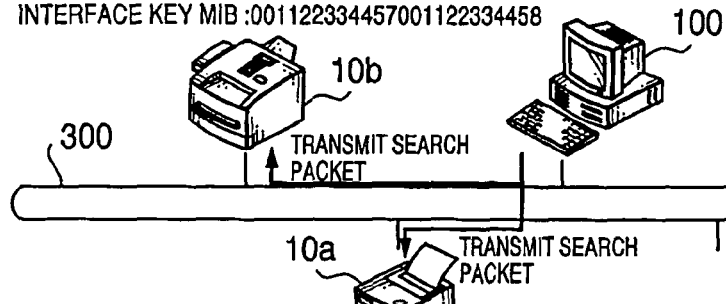

INTERFACE 1 MAC ADDRESS :001122334457
INTERFACE 2 MAC ADDRESS :001122334458
SERIAL NUMBER :0123457
INTERFACE KEY MIB :001122334457001122334458

FIG.8A

INTERFACE 1 MAC ADDRESS :001122334455
INTERFACE 2 MAC ADDRESS :001122334456
SERIAL NUMBER :0123456
INTERFACE KEY MIB :001122334457001122334456

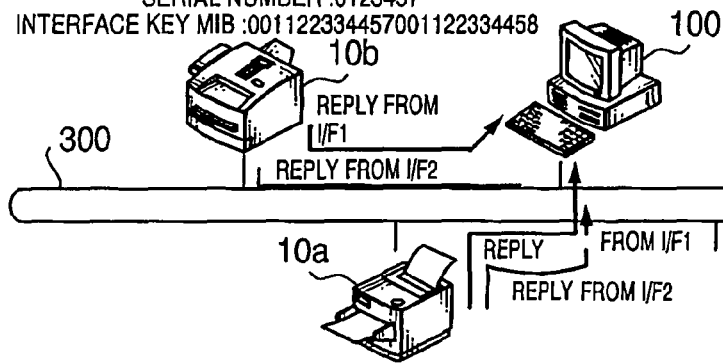

INTERFACE 1 MAC ADDRESS :001122334457
INTERFACE 2 MAC ADDRESS :001122334458
SERIAL NUMBER :0123457
INTERFACE KEY MIB :001122334457001122334458

FIG.8B

INTERFACE 1 MAC ADDRESS :001122334455
INTERFACE 2 MAC ADDRESS :001122334456
SERIAL NUMBER :0123456
INTERFACE KEY MIB :001122334457001122334458

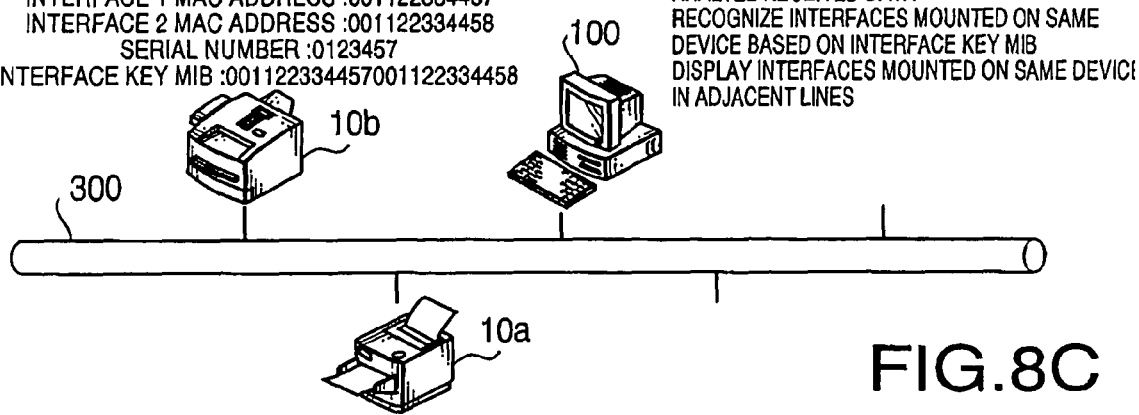

INTERFACE 1 MAC ADDRESS :001122334457
INTERFACE 2 MAC ADDRESS :001122334458
SERIAL NUMBER :0123457
INTERFACE KEY MIB :001122334457001122334458

ANALYZE RECEIVED DATA
RECOGNIZE INTERFACES MOUNTED ON SAME DEVICE BASED ON INTERFACE KEY MIB
DISPLAY INTERFACES MOUNTED ON SAME DEVICE IN ADJACENT LINES

FIG.8C

INTERFACE 1 MAC ADDRESS :001122334455
INTERFACE 2 MAC ADDRESS :001122334456
SERIAL NUMBER :0123456
INTERFACE KEY MIB :001122334457001122334456

FIG.10

| Node Name | Node Address | Printer Status | Printer Type | Node Type | Location | Node Firmwar... | Contact |
|---|---|---|---|---|---|---|---|
| B.200000 | 192.168.0.1 | SLEEP | B H-8050N series | NC-5200h(type 1) | | 1.00 | |
| B.200001 | 192.168.0.2 | 07/14/2005 09:40 | B FC-8820D | NC-9100h | | 1.01 | |
| B.200002 | 192.168.0.3 | 07/14/2005 09:40 | B FC-8820D | NC-7100w | | 1.00 | |
| B.200003 | 192.168.0.4 | Check Paper #1 ... | B FC-8820D | NC-9100h | | 1.07 | |
| B.200004 | 192.168.0.5 | SLEEP | B L-1651_1670N sar... | NC-4100h(type 1) | | | | a1 a2

Devices:5    Unconfigured:0

FIG.11A

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200001 | 192.168.0.2 | 07/14/2005 09:40 | B FC-8820D | NC-9100h | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |

Devices:5　Unconfigured:0

FIG.11B

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200001 | 192.168.0.2 | 07/14/2005 09:40 | B FC-8820D | NC-9100h | | 1.01 | |
| B.200002 | 192.168.0.3 | 07/14/2005 09:40 | B FC-8820D | NC-7100w | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |

Devices:5　Unconfigured:0

FIG.12A

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200001 | 192.168.0.2 | 07/14/2005 09:40 | B FC-8820D | NC-9100h | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |

Devices:5 | Unconfigured:0

FIG.12B

| Node Name | Node Address | Printer Status | Printer Type | Node Type | Location | Node Firmwar... | Contact |
|---|---|---|---|---|---|---|---|
| B 200000 | 192.168.0.1 | SLEEP | B H-8050N series | NC-5200h(type 1) | | 1.00 | |
| B.200002 | 192.168.0.3 | 07/14/2005 09:40 | B FC-8820D | NC-1100w | | 1.01 | |
| B.200003 | 192.168.0.4 | Check Paper #1 ... | B FC-8820D | NC-9100h | | 1.00 | |
| B.200004 | 192.168.0.5 | SLEEP | B L-1651_1670N sar... | NC-4100h(type 1) | | 1.07 | |

Devices:5 | Unconfigured:0

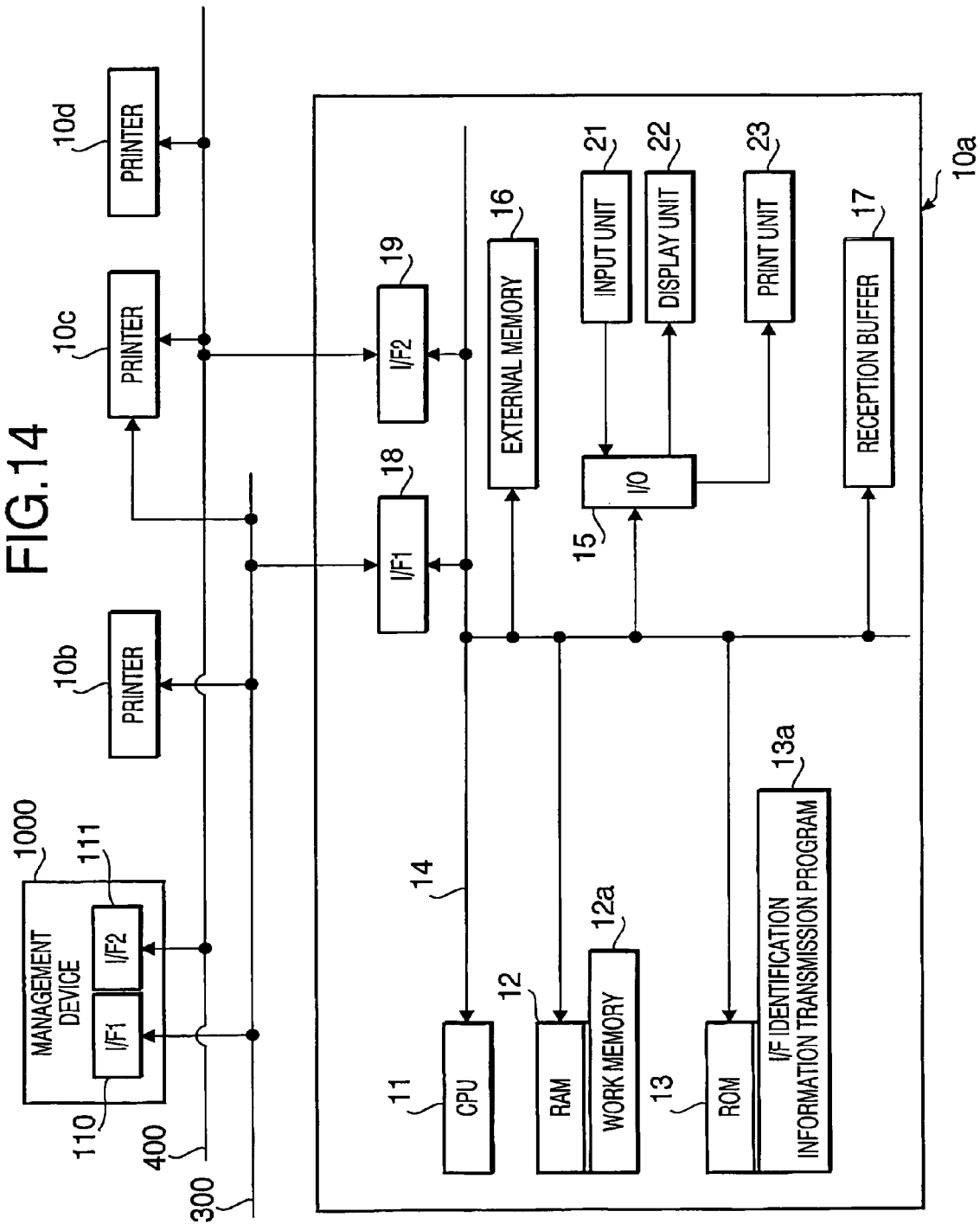

ns. A cross-reference to related application is provided.

IMAGE FORMATION DEVICE, MANAGEMENT DEVICE, NETWORK SYSTEM, CONTROL PROGRAM FOR IMAGE FORMATION DEVICE, AND CONTROL PROGRAM FOR MANAGEMENT DEVICE

CROSS-REFERENCE TO RELATED APPLICATION

This application claims priority under 35 U.S.C. §119 from Japanese Patent Application No. 2005-234679, filed on Aug. 12, 2005. The entire subject matter of the application is incorporated herein by reference.

BACKGROUND

1. Technical Field

The present invention relates to a network system including image formation devices (printers, etc.) and a management device (for managing the image formation devices) which are connected together by a network.

2. Related Art

An image formation device (e.g. printer) that can be shared among a plurality of host computers connected to the image formation device via a network is on the market today (see Japanese Patent Patient Provisional Publication No.HEI08-314651, for example) and there are also cases where a plurality of such printers are connected to a network. In order to use a printer via a network as above, it is necessary to manage the status, setting information, etc. of the printer. Such management becomes important especially when a plurality of printers are connected to a network and, application software, etc. for a management device for centralized management of the status and setting information of a plurality of printers is However, some printers are provided with two or more network interfaces for network connection. When a management device needs management information on network interfaces of printers existing on a network, the management device transmits a management information request individually to each network interface via the network and the management information is returned from each network interface in response to the management information request.

SUMMARY

The present invention has been made in consideration of the above problems, and is advantages in that an image formation device, a management device, programs for the image formation device and the management device, and a network system including the image formation device and the management device, allowing the user of the management device to easily recognize two or more network interfaces of the same image formation device and to manage such network interfaces efficiently, are provided.

BRIEF DESCRIPTION OF THE ACCOMPANYING DRAWINGS

FIG. 8A-8C are schematic diagrams for explaining the outline of management of network interfaces in the network system of FIG. 1.

FIG. 10 is an example of a management information screen (displaying management information on the network interfaces) displayed by the management device of the present invention.

FIGS. 11A and 11B are another example of the management information screen of the present invention.

FIGS. 12A and 12B are still another example of the management information screen of the present invention.

FIG. 14 is a block diagram showing another example of a network system in accordance with the present invention, in which a management device is connected to two or more networks.

DETAILED DESCRIPTION

General Overview

Figure 1:
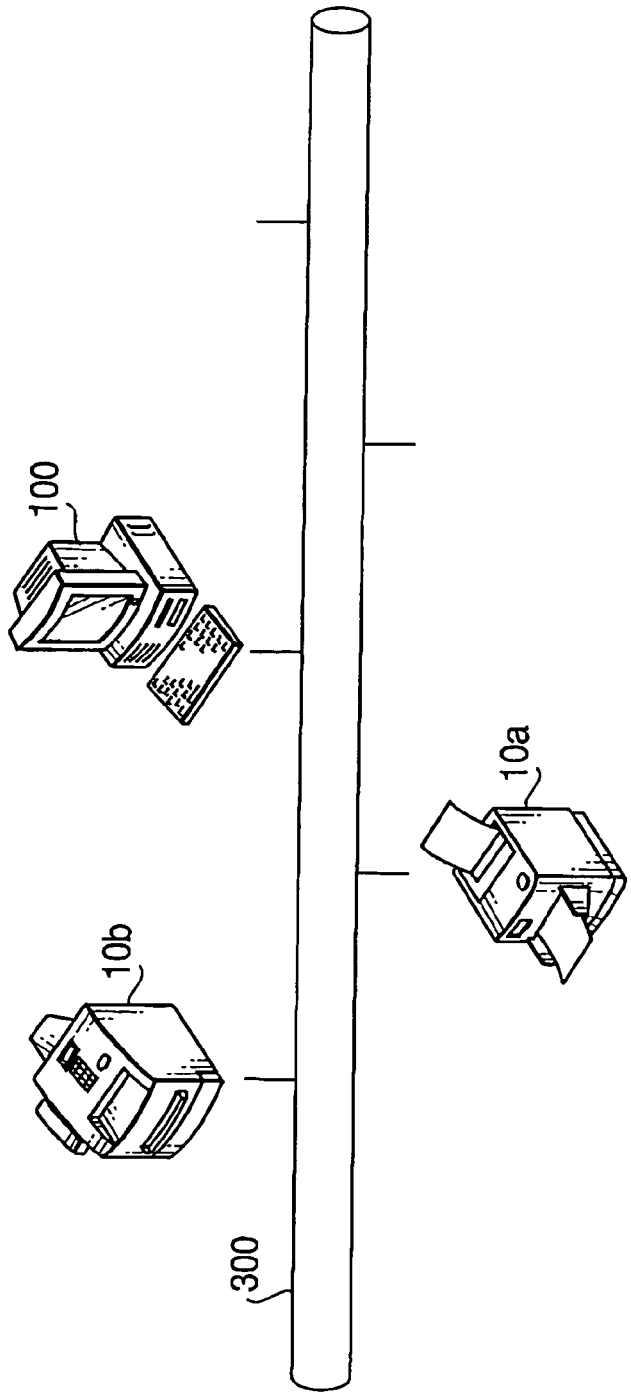
FIG. 1 is a schematic diagram showing a network system in accordance with an embodiment of the present invention.

In accordance with an aspect of the present invention, there is provided an image formation device having two or more network interfaces, each of which is assigned unique identification information, comprising: a combined identification information generating unit which generates combined identification information for each network interface by combining multiple pieces of the identification information assigned to the network interfaces; a presence check request receiving unit which receives presence check requests, transmitted from a management device via a network, for a check on the presence or absence of each network interface on the network, with the network interfaces, respectively; and a combined identification information transmitting unit which transmits the combined identification information of each network interface individually from each network interface.

In accordance with an aspect of the present invention, there is provided a management device which is connected to one or more image formation devices (each having at least one network interface) via a network, comprising: a presence check request transmitting unit which transmits presence check requests to the network interfaces of the image information devices via the network; an identification information receiving unit which receives response information returned from the network interfaces of the image formation devices in response to the presence check requests; a combined identification information equivalence judgment unit which makes a judgment on equivalence of multiple pieces of combined identification information when multiple pieces of combined identification information (each of which is generated by combining multiple pieces of identification information assigned to two or more network interfaces) are received from two or more of the network interfaces as the response information; and a management unit which manages network interfaces whose combined identification information is judged to be equivalent by the combined identification information equivalence judgment unit as network interfaces belonging to the same image formation device.

In accordance with an aspect of the present invention, there is provided a network system comprising: one or more image formation devices each of which has at least one network interface; and a management device which is connected to the one or more image formation devices via a network. In the network system, the one or more image formation devices include at least one image formation device having two or more network interfaces each of which is assigned unique identification information. The image formation device having two or more network interfaces includes a combined identification information generating unit which generates combined identification information for each network interface by combining multiple pieces of identification information assigned to the network interfaces; a presence check request receiving unit which receives presence check requests (transmitted information the management device via the network for a check on the presence or absence of each network interface on the network) with the network interfaces, respectively; and a combined identification information transmitting unit which transmits the combined identification information of each network interface individually from each network interface. The management device includes a presence check request transmitting unit which transmits the presence check requests to the network interfaces of the image formation devices via the network; an identification information receiving unit which receives response information returned form the network interfaces of the image formation devices in response to the presence check requests; a combined identification information equivalence judgment unit which makes a judgment on an equivalence of multiple pieces of combined identification information when multiple pieces of combined identification information are received from two or more network interfaces as the response information; and a management unit which manages network interfaces whose combined identification information is judged to be equivalent by the combined identification information equivalence judgment unit as network interfaces belonging to the same image formation device.

In the above configuration, when an image formation device having two or more network interfaces receives the presence check requests from the management device, each of the network interfaces receiving the presence check request transmits the combined identification information for the network interface (generated by combining the identification information assigned to the network interface itself and the identification information assigned to one or more other network interfaces of the image formation device) to the management device. Therefore, even if two pieces of identification information assigned to two network interfaces of an image formation device are totally irrelevant to each other, by use of the combined identification information (generated by combining the two pieces of identification information) as the response information for the presence check, the management device receiving the response information can easily recognize that the two pieces of response information (combined identification information) are those deriving from the same image formation device even though the network interfaces are different from each other. Specifically, in the management device of the present invention, the combined identification information equivalence judgment unit judges whether or not two or more pieces of combined identification information received are equivalent to one another, and if equivalent, the network interfaces transmitting the combined identification information judged to be equivalent can be managed as network interfaces belonging to the same image formation device.

"Two pieces of combined identification information are equivalent to each other." means that a one-to-one correspondence (one-to-one relationship) holds between the two pieces of combined identification information in regard to the contents of each piece of identification information included in the combined identification information. Therefore, the equivalence is not restricted to total coincidence between two pieces of combined identification information in regard to the combination and order of codes forming the combined identification information.

In accordance with an aspect of the present invention, there is provided a computer readable medium having computer readable instructions stored thereon, which, when executed by a computer functioning as an image forming device having two or more network interfaces each of which is assigned unique identification information, cause the computer to generate combined identification information for each network interface by combining multiple pieces of identification information assigned to the network interfaces, to receive presence check requests, transmitted from a management device via a network for El check on the presence or absence of each network interface on the network, with the network interfaces, respectively, and to transmit the combined identification information of each network interface individually from each network interface.

In accordance with an aspect of the present invention, there is provided a computer readable medium having computer readable instructions stored thereon, which, when executed by a computer functioning as a management device connected to one or more image formation devices, each having at least one network interface, cause the computer to transmit presence check requests to the network interfaces of the image formation devices via the network, to receive response information returned from the network interfaces of the image formation devices in response to the presence check requests, to make a judgment on an equivalence of multiple pieces of combined identification information in response to the multiple pieces of combined identification information, each of which is generated by combining multiple pieces of identification information assigned to two or more network interfaces, being received from two or more network interfaces as the response information; and to manage network interfaces whose combined identification information is judged to be equivalent as network interfaces belonging to the same image formation device.

The above program for an image formation device or a management device can be installed in a computer via a medium storing the program (CD-ROM, DVD-ROM, etc.) or by downloading the program from a server via a communication network, by which the aforementioned image formation device, management device and network system in accordance with the present invention is easily realized.

In one embodiment of the invention, the management device further comprises a recognition result displaying unit which displays results of recognition of the network interfaces based on the received combined identification information.

With the above configuration, the relationship between the network interfaces and the image formation devices can be displayed in an easy-to-understand style based on the received combined identification information.

In this case, the recognition result displaying unit is configured to selectively display one of multiple pieces of recognition result information on the network interfaces whose combined identification information is judged to be equivalent by the combined identification information equivalence judgment unit.

With the above configuration, even when network interfaces exceeding the total number of image formation devices are recognized, only a piece of recognition result information is displayed as a representative of each image formation device, by which the user can intuitively recognize how many image formation devices are connected to the network.

In the above configuration, the recognition result information on other network interfaces (that were not selected as the representative of each image formation device) can also he displayed as needed in response to a prescribed user operation. Specifically, the recognition result displaying unit can be configured to switchably display one of the multiple pieces of recognition result information on the network interfaces whose combined identification information is judged to be equivalent by the combined identification information equivalence judgment unit in a display area capable of displaying only a piece of recognition result information.

With the above configuration, other recognition result information not displayed in the display area can be called up to the display area by a scrolling operation (e.g. a mouse click on a scroll icon) by the user.

In certain embodiments of the invention, the identification information assigned to each network interface is a series of codes of a fixed number of digits prescribed so that combination and order of the codes are unique to the network interface. The combined identification information generating unit of the image formation device generates the combined identification information on each network interface by combining code sequences forming the multiple pieces of identification information assigned to the network interfaces of the image formation device according to a rule conserving a mathematical combination of the codes included in each piece of identification information. In this case, the combined identification information equivalence judgment unit of the management device can be configured to judge that multiple pieces of combined identification information are equivalent when the multiple pieces of combined identification information comprises the same combination of codes (irrespective of the order of the codes).

By generating the combined identification information (on each network interface of an image formation device) according to a rule conserving a mathematical combination of the codes included in each piece of identification information (assigned to each network interface of the image formation device), the probability of accidental coincidence of multiple pieces of combined identification information transmitted from different image formation devices can be reduced considerably. Further, since the mathematical combination of the codes included in the original identification information assigned to each network interface (which is unique to the network interface) is conserved, the algorithm for reading or extracting the original identification information from the combined identification information is simplified. Consequently, not only is the user able to easily recognize whether or not two or more network interfaces belong to the same image formation device but also the convenience of individually checking the presence/absence of each network interface is enhanced.

As the identification information assigned to each network interface (a series of codes of a fixed number of digits prescribed so that combination and order of the codes are unique to the network interface), the MAC (Media Access Control) address, which is uniquely assigned to each of various devices (e.g. network interfaces), can be employed, for example.

In the above configuration, the combined identification information generating unit of the image formation device can be configured to generate the combined identification information on each network interface by combining the code sequences forming the multiple pieces of identification information assigned to the network interfaces of the image formation device in series without segmenting each of the code sequences and without changing the order of the code sequences in each piece of identification information. In this case, the combined identification information equivalence judgment unit of the management device can be configured to judge that multiple pieces of combined identification information are equivalent if all the code sequences included in the combined identification information are common to the multiple pieces of combined identification information.

Specifically, the combined identification information generating unit of the image formation device can be configured to generate the combined identification information on each network interface by combining the multiple pieces of identification information assigned to the network interfaces in series connection without segmenting each piece of identification information. In this case, the combined identification information equivalence judgment unit of the management device can be configured to judge that multiple pieces of combined identification information are equivalent if all pieces of identification information included in the combined identification information are common to the multiple pieces of combined identification information.

In the above configuration, the combined identification information on each network interface is generated by combining the multiple pieces of identification information assigned to the network interfaces of the image formation device in series, without segmenting each piece of identification information. Therefore, the multiple pieces of combined identification information generated for the network interfaces of the same image formation device are made of the same combination of identification information (even though the order of the multiple pieces of combined identification information can differ among the multiple pieces of combined identification information). When the number of codes (i.e. data length) of the original identification information is known, the original pieces of identification information can easily be restored by segmenting the generated combined identification information in units of the data length.

More specifically, the combined identification information generating unit of the image formation device can be configured to generate the combined identification information on each network interface receiving the presence check request so that a position of the identification information assigned to the network interface receiving the presence check request in the combined identification information is fixed. In this case, the combined identification information equivalence judgment unit of the management device can be configured to segment each piece of combined identification information in units of the number of digits of the identification information and judge that multiple pieces of combined identification information are equivalent if all pieces of identification information obtained by the segmentation are common to the multiple pieces of combined identification information.

In the above configuration, the position of the identification information on each network interface in consideration (receiving the presence check request and transmitting the combined identification information) in the combined identification information is constantly Fixed at a prescribed position.

For example, when an image formation device has three network interfaces (first through third interfaces) and the position of the identification information on each interface in consideration is prescribed at the front end of the combined identification information, the combined identification information on the first interface is generated so that the identification information on the first interface is at the front end of the combined identification information, the combined identification information on the second interface is generated so that the identification information on the second interface is at the front end of the combined identification information, and the combined identification information on the third interface is generated so that the identification information on the third interface is at the front end of the combined identification information. Of course, the position of the identification information on each interface network in consideration can also be at the center or rear end of the combined identification information as long as it is fixed. With the above configuration, the management device receiving each piece of combined identification information can easily identify the sender of combined identification information since the position of the identification information on the interface network in consideration (receiving the presence check request and transmitting the combined identification information) is known.

The combined identification information generating unit of the image formation device can also be configured to generate the combined identification information for each network interface by combining the multiple pieces of identification information assigned to the network interfaces in series connection in a uniquely prescribed order. In this case, the combined identification information equivalence judgment unit of the management device can be configured to judge that multiple pieces of combined identification information are equivalent if a combination and order of the codes included in the combined identification information are common to the multiple pieces of combined identification information. For example, when the image formation device has three network interfaces (first through third interfaces), the combined identification information generating unit generates the combined identification information for each network interface by combining the multiple pieces of identification information assigned to the network interfaces in the same order (e.g. in the order of the first interface, the second interface and the third interface) irrespective of which interface is in consideration. With the above configuration, the algorithm for the equivalence judgment is simplified dramatically since the equivalence judgment is only required to make a simple comparison to judge whether or not the order of codes is totally common to multiple pieces of combined identification information received form two or more network interfaces. In this case, even the need for segmenting each piece of combined identification information to recognize each piece of identification information on each network interface is eliminated.

The combined identification information generating unit of the image formation device can also be configured to generate the combined identification information for each network interface by combining code sequences forming the multiple pieces of identification information assigned to the network interfaces while rearranging the code sequences according to a prescribed rule. In this case, the combined identification information equivalence judgment unit of the management device can be configured to restore (the arrangement of codes of) each piece of identification information included in the combined identification information based on the prescribed rule and judge that multiple pieces of combined identification information are equivalent if all pieces of identification information obtained by the restoration are common to the multiple pieces of combined identification information. For example, the combined identification information of each network interface of an image formation device can be generated by segmenting each piece of identification information assigned to each network interface of the image formation device into some (partial) code sequences, successively extracting code sequences cyclically from the multiple pieces of identification information (assigned to the network interfaces) in a prescribed order of the network interfaces (e.g. in the order of a first interface, a second interface and a third interface) and connecting (rearranging) the extracted code sequences in order of the extraction. This method is advantageous in that the algorithm for the restoration of each piece of identification information is comparatively simple.

Embodiment

Referring now to the drawings, a description will be given in detail of an embodiment of the present invention. "Image formation devices" in accordance with the present invention can include printers, MFPs (Multi Function Peripherals (having the printer function, FAX function, scanner function, copy function, etc. in one body)), etc. In the following embodiment, a network system, including printers (as image formation devices) and a terminal device (as a management device) connected together by a network, will be described in detail. It is assumed in the following embodiment that the number of network interfaces (interfaces for network connection) of each device is at most two.

FIG. 1 is a schematic diagram showing a network system 1 (electronic peripheral control system) in accordance with an embodiment of the present invention. In the network system of FIG. 1, printers 10a and 10b (as image formation devices), other image formation devices (unshown) and a terminal device for managing the printers (hereinafter referred to as a "management device 100") are connected together by a communication network 300. The communication network 300 can be implemented as a wired communication network including serial communication cables, parallel communication cables, LAN cables, etc. The communication network 300 can also be implemented as a wireless communication network employing a wireless LAN, IEEE 802.11x, Bluetooth, etc.

Figure 2:
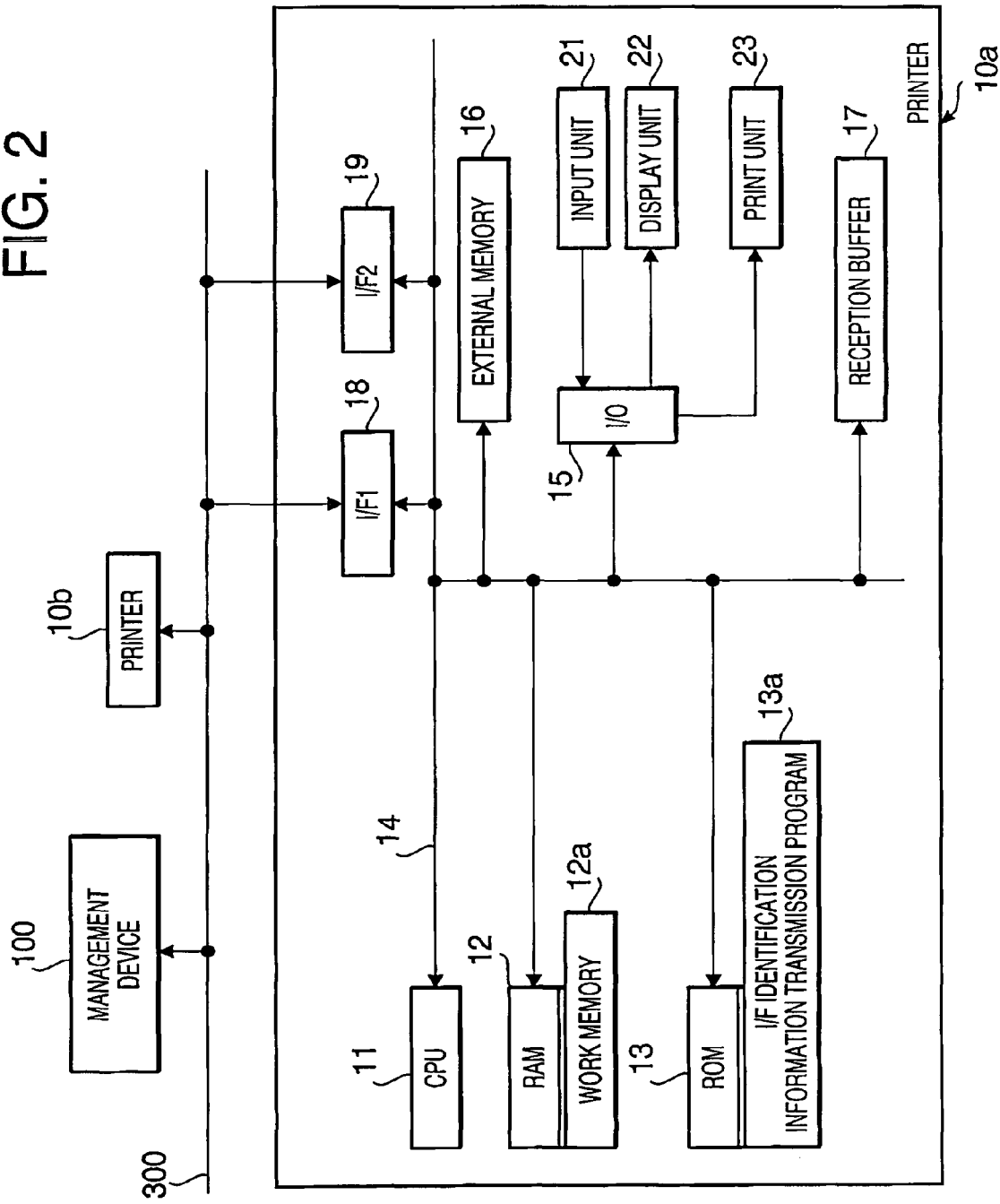
FIG. 2 is a block diagram showing the electrical configuration of a printer (image formation device) included in the network system of FIG. 1.

FIG. 2 is a block diagram showing the electrical configuration of the printer 10a. She printer 10a, having a hardware configuration similar to the printer 10b, includes a CPU (Central Processing Unit) 11, a RAM (Random Access Memory) 12 including a work memory 12a, a ROM (Read Only Memory) 13 storing various programs, a bus line 14, an I/O (Input/Output) unit 15, an external memory 16 as a nonvolatile memory such as an EEPROM (Electrically Erasable Programmable ROM), a reception buffer memory 17 for temporarily storing print control data received from the communication network 300 (hereinafter referred to simply as a "reception buffer 17"), network interfaces (communication interfaces) 18 and 19 ("I/F1" and "1/F2" in FIG. 2) connected to the communication network 300, an input unit 21 (having a touch panel, push button switches, numeric keys, etc.), a display unit 22 (having an LCD) (Liquid Crystal Display), etc.), and a print unit 23 (implemented by a well-known inkjet printing mechanism, laser printing mechanism, thermal transfer printing mechanism or dot impact printing mechanism, for example). The input unit 21, the display unit 22 and the print unit 23 arc connected to the I/O unit 15.

The printers 10a and 10b are connected to the communication network 300 via the network interfaces 18 and 19, respectively. The network interfaces 18 and 19 are configured as LAN cards of a well-known type. As shown in FIG. 1, a serial number "0123456" is assigned to the printer 10a and MAC addresses "001122334455" and "001122334456" are stored in prescribed storage areas of storage units (e.g. PROMs allowing writing only once) of the network interfaces 1.8 and 19 of the printer 10a, respectively. Meanwhile, a serial number "0123457" is assigned to the printer 10b and MAC addresses "001122334457" and "001122334458" are stored in storage units of the two network interfaces of the printer 10b, respectively. The MAC address (Media Access Control address), used as an identifier in the present invention, is a hardware address which is set for identifying each host on a network. In an Ethernet, a 48-bit identification code (called an "Ethernet address") is assigned to each NIC (network Interface Card). In the Ethernet address, the first 24 bits represent an ID which is unique to a vendor managed by the IEEE (Institute of Electrical and Electronics Engineers) and the remaining 24 bits represent a serial number of the NIC. Therefore, the MAC address (made of a series of codes of a prescribed number of digits so that the combination and the order of the codes are unique) is a number that is unique in the world.

Figure 3:
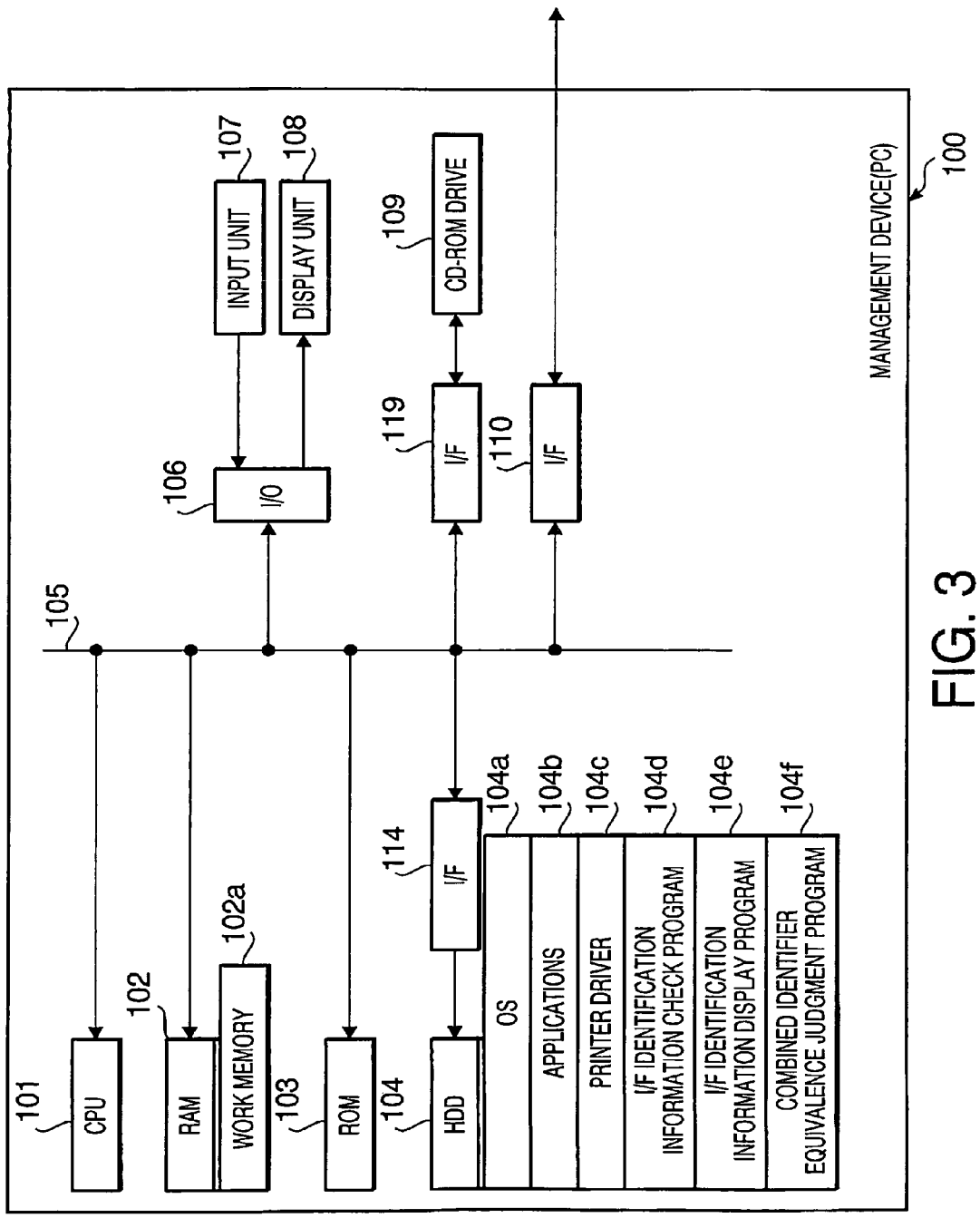
FIG. 3 is a block diagram showing the electrical configuration of a management device included in the network system of FIG. 1.

FIG. 3 is a block diagram showing the electrical configuration of the management device 100. The management device 100 is implemented by a personal computer (or a workstation) including a CPU 101, a RAM 102 including a work memory 102a, a ROM 103 storing various programs, an HDD (Hard Disk Drive) 104 as a storage unit, a bus line 105, an I/O unit 106, a CD-ROM drive 109, a network interface (communication interface) 110 connected to the communication network 300, etc. The HDD 104 and the CD-ROM drive 109 are connected to the bus line 105 via interfaces 114 and 119, respectively. In the HDD 104, an OS (Operating System) 104a as basic software of the management device 100, various applications 104b having the print function, a printer driver 104c (executing a print control process to the printer 10a), etc. have been installed. The HDD 104 also stores temporary print control data (forming print job data generated by each application 104b) to be processed by the print control process executed by the printer driver 104c. To the I/O unit 106, an input/operation unit 107 (including a keyboard, mouse, etc.) and a display unit 108 (including an LCD or CRT) are connected.

Principal functions (a combined identification information generating function, a presence check request receiving function and a combined identification information transmitting function) of each image formation device in the network system of the present transmitting are implemented by the CPU 11 of the image formation device by executing an I/F identification information transmission program 13a stored in the ROM 13. Meanwhile, principal functions (a presence check request transmitting function, an identification information receiving function, a combined identification information equivalence judgment function and a management function) of the management device in the network system of the present invention are implemented by the CPU 101 of the management device 100 by executing an I/F identification information check program 104d, an I/F identification information display program 104e and a combined identifier equivalence judgment program 104f stored in the HDD 104. The I/F identification information check program 104d, the I/F identification information display program 104e and the combined identifier equivalence judgment program 104f can be installed in the HDD 104 of the management device 100 via a recording medium such as a CD-ROM (storing the programs 104d, 104e and 104f) which can be read by the CD-ROM drive 109, or by downloading the programs via a communication network. In each printer (10a, 10b), the I/F identification information transmission program 13a does not necessarily have to be prestored in the ROM 13 as above. For example, the I/F identification information transmission program 13a can also be read out from a recording medium (e.g. CD-ROM) by the CD-ROM drive 109 of the management device 100 or downloaded by the management device 100 via a communication network, transmitted to each printer 10a, 10b via the communication network 300, and installed in the external memory 16 (e.g. EEPROM) of each printer 10a, 10b.

In network system configured as above, the management device 100 transmits a network interface check request (presence check request) to the network interfaces of the image formation devices (printers 10a and 10b, etc.) connected to the communication network 300 in order to check the presence/absence of each network interface on the network. Each image formation device (10a, 10b, etc.) receiving the presence check request sends back an identifier (identification information) of each network interface receiving the presence check request to the management device 100 individually from each network interface. When an image formation device has two or more network interfaces, like the printers 10a and 10b each having two network interfaces 18 and 19, the image formation device sends back a combined identifier (combined identification information) regarding each network interface, generated by combining the identifiers of the two or more network interfaces of the image formation device, to the management device 100 individually from each network interface. The management device 100 receiving the combined identifiers from the network interfaces existing on the communication network 300 judges whether the received combined identifiers include two or more equivalent combined identifiers or not. When equivalent combined identifiers are included in the received combined identifiers, the management device 100 manages the network interfaces considering that the network interfaces sending back the equivalent combined identifiers are those of the same device.

Here, the I/F identification information transmission program 13a of the printer 10a, 10b for transmitting the identifier or combined identifier to the management device 100 will be explained in detail referring to FIG. 4 and FIGS. 8A-8C.

Figure 4:
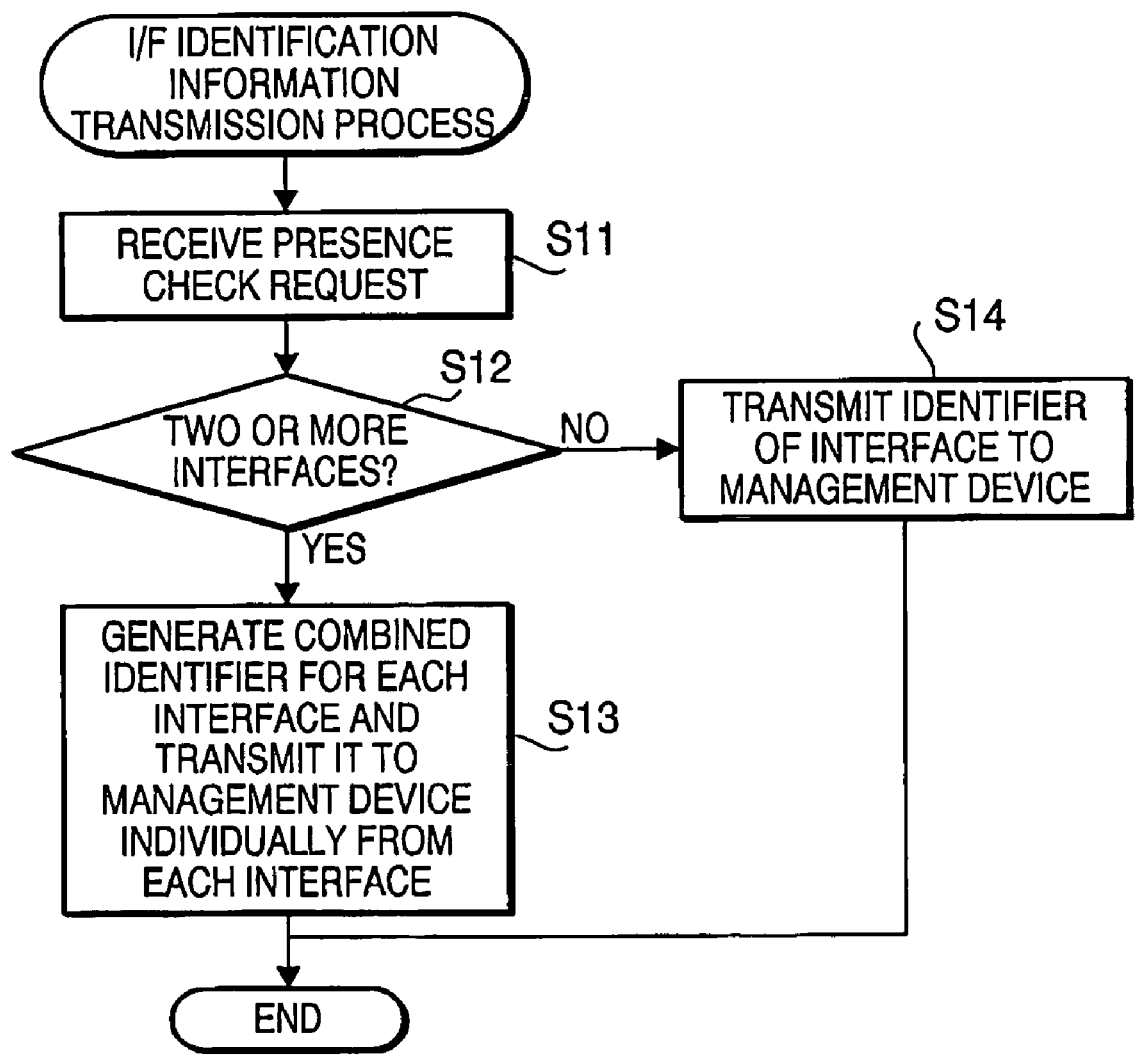
FIG. 4 is a flow chart showing the flow of an I/F identification information transmission program which is executed by an image formation device.

FIG. 4 is a flow chart showing the flow of the I/F identification information transmission program 13a (I/F identification information transmission process). In the first step S11, the image formation device 10a receives a search packet for the check on the presence/absence of each network interface (i.e. the presence check request) from the management device 100 (see FIG. 8A). In the next step S12, the image formation device 10a (CPU 11) judges whether or not the image formation device 10a has two or more network interfaces. If the image formation device 10a has two or more network interfaces (S12: YES), the process advances to step S13. In the step S13, the CPU 11 generates an interface key (combined identifier) regarding each network interface (18, 19) by combining the MAC addresses (identifiers) of the network interfaces, and sends back each of the generated interface keys (combined identifiers) to the management device 100 individually from each network interface receiving the presence check request (see FIG. 8B). Thereafter, the process of FIG. 4 is ended. On the other hand, if the image formation device 10a has only one network interface (S12: NO), the CPU 11 sends back the single MAC address (identifier) of the network interface receiving the presence check request to the management device 100 from the network interface (S14) and ends the process of FIG. 4.

Figure 9:
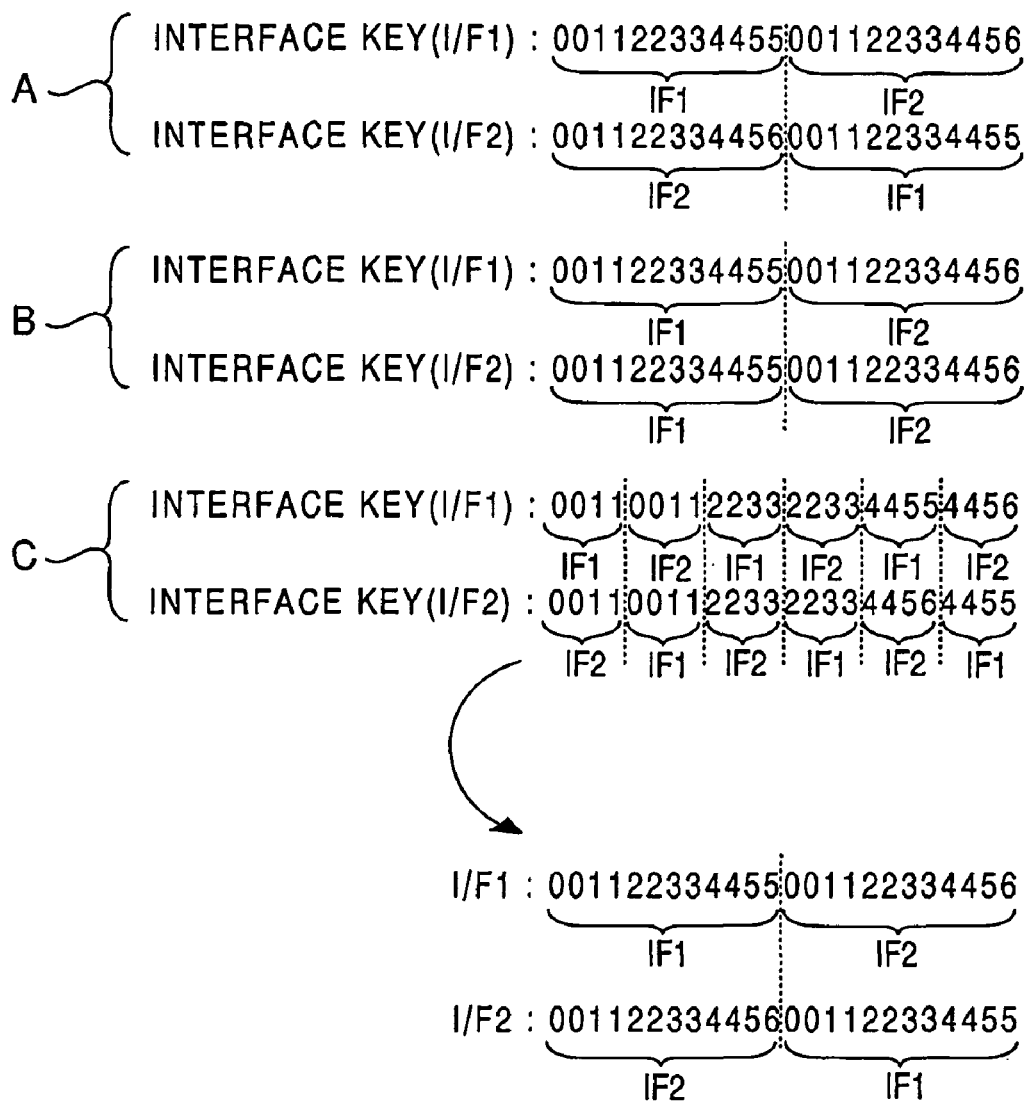
FIG. 9 is a schematic diagram showing examples of methods for generating a combined identifier in accordance with the present invention.

In this embodiment, the combined identifier of each network interface is generated by combining code sequences forming the two MAC addresses of the two network interfaces in series, without segmenting each code sequence (e.g. 16-bit code sequence) and without changing the order of the code sequences in each MAC address. FIG. 9 is a schematic diagram showing examples of such methods for generating the combined identifier.

In the example A shown in FIG. 9, the combined identifier (interface key) of each network interface (18, 19) receiving the presence check request is generated by connecting the identifier (MAC address) of the network interface receiving the presence check request and the identifier (MAC address) of the other network interface in this order, in which the position of the MAC address of the network interface receiving the presence check request in the combined identifier is fixed (at the front end of the combined identifier).

In the example B shown in FIG. 9, the position of the MAC address of each network interface (I/F1, I/F2) in the combined identifier is fixed, that is, the combined identifier of each network interface is generated by combining the MAC addresses of the network interfaces 18 and 19 (I/F1 and I/F2) in series in a uniquely prescribed order (I/F1+I/F2 in this example).

In the example C shown in FIG. 9, the MAC address of each network interface (I/F1, I/F2) is segmented in units of 16 bits and the 16-bit segments of the MAC addresses of the two network interfaces are alternately connected together.

In each of the above methods (A, B, C), code sequences (e.g. 16-code sequences) forming the two pieces of identification information (MAC addresses) are combined by rearranging the code sequences according to a prescribed rule. In this embodiment, the method A or B is used for generating the combined identifier.

Next, the I/F identification information check program 104*d* which is executed by CPU 101 of the management device 100 for managing the network interfaces of the image formation devices (targets of management) will be explained in detail referring to FIG. 5 and FIGS. 8A-8C.

Figure 5:
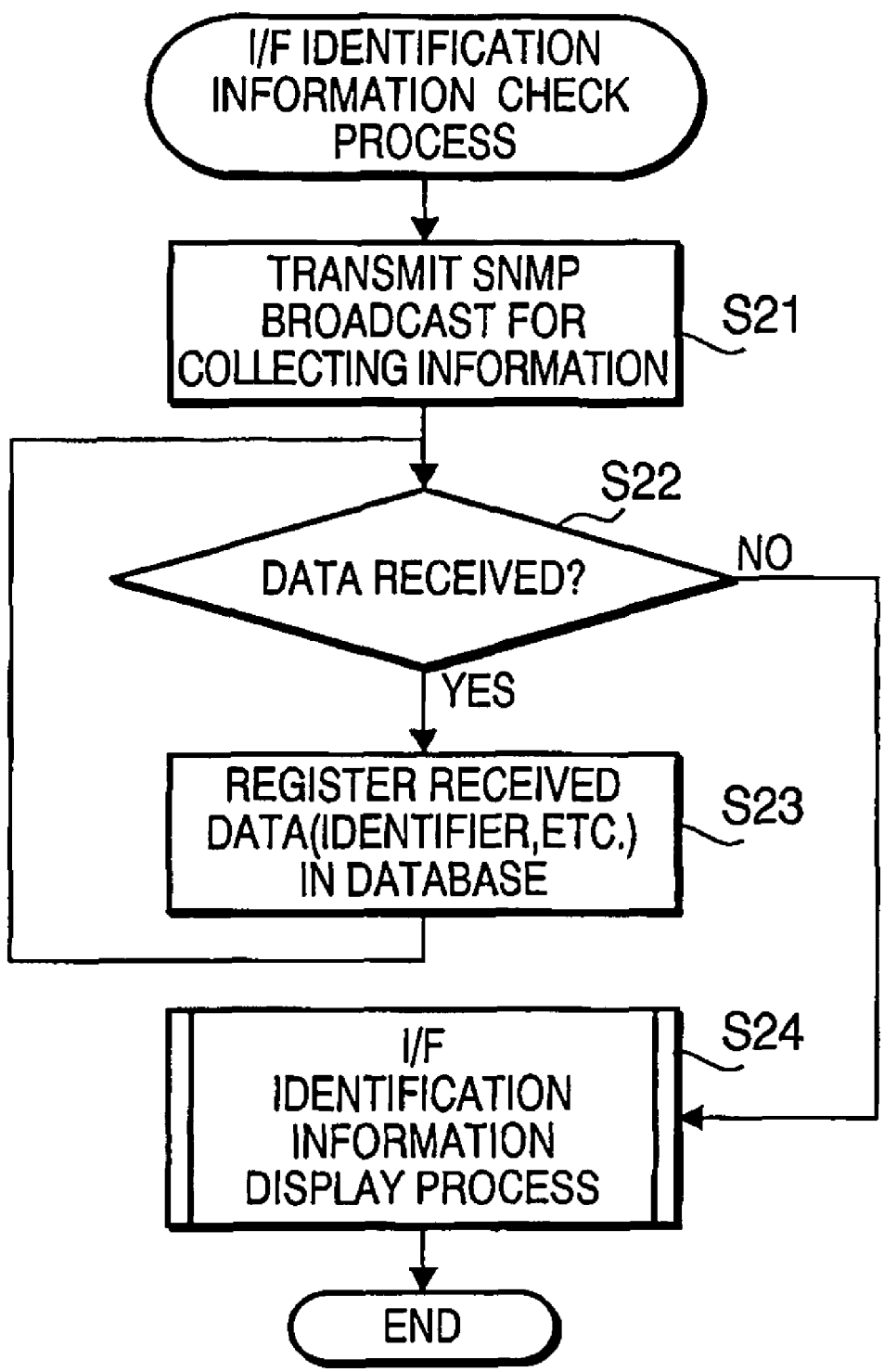
FIG. 5 is a flow chart showing the flow of an I/F identification information check program which is executed by a management device of the present invention.

FIG. 5 is a flow chart showing the flow of the I/F identification information check program 104*d* (I/F identification information check process). In the first step S21, the management device 100 transmits an SNMP (Simple Network Management Protocol) broadcast for monitoring and controlling communication devices on the network 300 via the network 300. In the next step S22, the management device 100 receives management information which has been stored in each network interface of the communication devices from each network interface. The management information received from each network interface includes the identifier or the combined identifier (explained above) of the network interface along with information specific to the network interface. The management information received from the network interfaces is stored as a database in a prescribed storage area of the HDD 104 of the management device 100 (S23). After the data reception is finished, the I/F identification information display program 104*e* for displaying the collected management information on the display unit 108 is executed (S24) and thereafter the I/F identification information check program 104*d* of FIG. 5 is ended.

Figure 6:
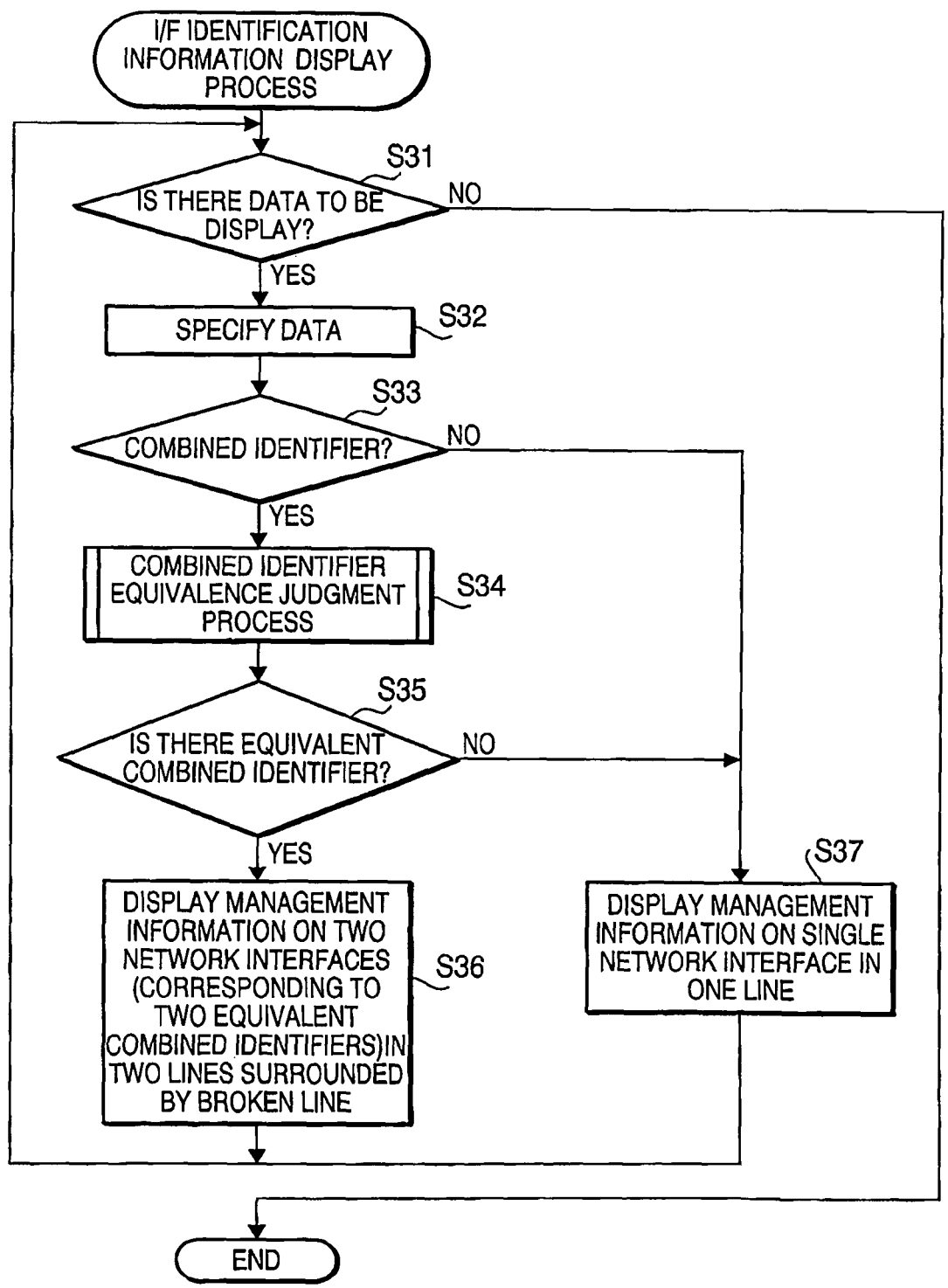
FIG. 6 is a flow chart showing the flow of an I/F identification information display program which is executed by the management device in step S24 of FIG. 5.

FIG. 6 is a flow chart showing the flow of the I/F identification information display program 104*e* which is executed by the CPU 101 in the step S24 of FIG. 5. In the first step S31, the CPU 101 of the management device 100 judges whether or not data (management information) to be displayed on the display unit 108 exists in the database in the HDD 104. If there exists no data to be displayed (S31: NO), the I/F identification information display program 104*e* of FIG. 6 is ended. If data to be displayed exists in the database (S31: YES), the CPU 101 specifies a piece of management information to be displayed from the database (S32). In the next step S33, the CPU 101 judges whether the identifier included in the specified management information is a combined identifier or not. The judgment is made based on whether the number of bits of the identifier exceeds 48 bits or not. If the identifier is not a combined identifier (S33: NO), the CPU 101 displays the management information corresponding to the identifier (S37). In this embodiment, the management information is displayed on the display unit 108 in a list format like the one shown in FIG. 10. In the case where the identifier is not a combined identifier, the management information is displayed in one line (like "a1" in FIG. 10). If the identifier is a combined identifier (S33: YES), the CPU 101 executes the combined identifier equivalence judgment program 104*f* (S34) and judges whether or not there exists another combined identifier equivalent to the combined identifier in question (which is made of a combination of identifiers) based on the result of the execution of the combined identifier equivalence judgment program 104*f* (S35). If there exists no equivalent combined identifier (S35: NO), the process advances to the step S37, in which the CPU 101 segments the combined identifier in half and displays the management information corresponding to the front identifier (front half of the combined identifier) in one line (like "a1" in FIG. 10). This is a case where the communication device corresponding to the management information specified in S32 has two or more (two in this embodiment) network interfaces and one of the network interfaces is not connected to the network 300 which is connected to the management device 100. In this embodiment, such a network interface not connected to the management device 100 is excluded from the targets of management and no display is made for the network interface. On the other hand, if there exists a combined identifier equivalent to the combined identifier in question (S35: YES), the process advances to step S36, in which the CPU 101 displays two pieces of management information of the two network interfaces, corresponding to the two equivalent combined identifiers, in two adjacent lines while surrounding the two adjacent lines with a broken line (like "a2" in FIG. 10) to clearly indicate that the two network interfaces are mounted on the same device. After displaying the management information, the CPU 101 returns to the step S31 to make the judgment on the presence/absence of management information (regarding an identifier) that has not been displayed yet. The loop is repeated until all the management information (that should be displayed) is displayed on the display unit 108.

Figure 7:
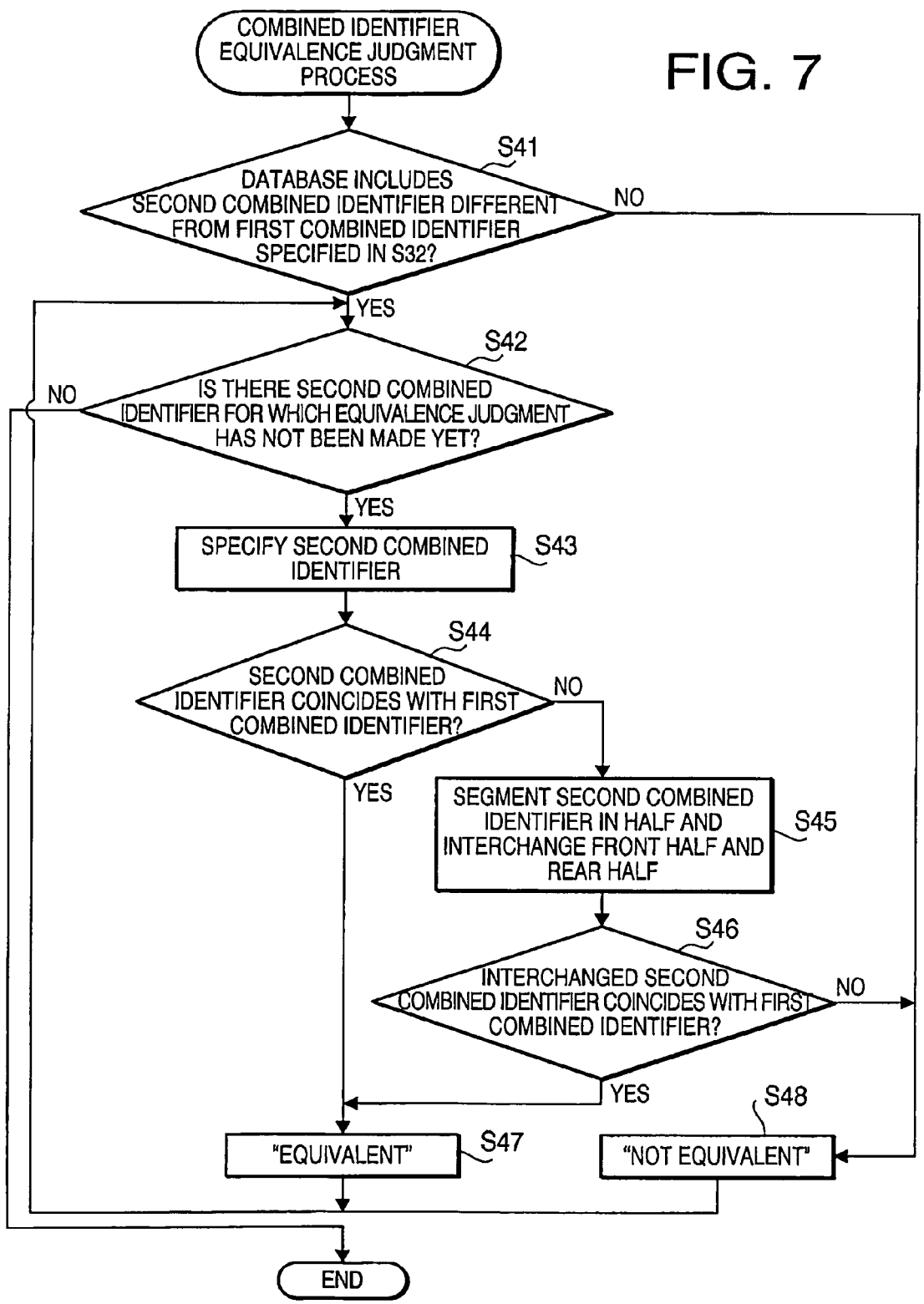
FIG. 7 is a flow chart showing the flow of a combined identifier equivalence judgment program which is executed by the management device in step S34 of FIG. 6.

FIG. 7 is a flow chart showing the flow of the combined identifier equivalence judgment program 104*f* (combined identifier equivalence judgment process) which is executed by the CPU 101 in the step S34 of FIG. 6. In the first step S41, the CPU 101 judges whether or not the database in the HDD 104 includes a combined identifier (second combined identifier) different from the combined identifier specified from the database in the step S32 (first combined identifier). The judgment is made based on whether the database further includes an identifier exceeding 48 bits or not. If the database includes no second combined identifier (S41: NO), the CPU 101 judges that no combined identifier equivalent to the first combined identifier exists in the database (S48) and thereafter advances to step S42. In this case, the combined identifier equivalence judgment program 104*f* of FIG. 7 is ended since the database includes no other second combined identifier (S42: NO). On the other hand, if the database includes a second combined identifier (S41: YES), the process advances to the step S42, in which the CPU 101 judges whether or not there exists a second combined identifier for which an equivalence judgment of steps S44-S48 has not been made yet. If there exists no such second combined identifier (S42: NO), the combined identifier equivalence judgment program 104f of FIG. 7 is ended. If there exists such a second combined identifier (S42: YES), the CPU 101 specifies a second combined identifier from the one or more second combined identifiers for which the equivalence judgment has not been made yet (S43) and judges whether or not the specified second combined identifier coincides with the first combined identifier (S44). In the step S44, the CPU 101 judges whether the arrangement (order) of all the codes included in the specified second combined identifier coincides with that of the first combined identifier. If the specified second combined identifier coincides with the first combined identifier (S44: YES), the CPU 101 judges that the specified second combined identifier is equivalent to the first combined identifier (S47). If the specified second combined identifier does not coincide with the first combined identifier (S44: NO), the process advances to step S45, in which the CPU 101 segments the second combined identifier in half and recombines the front identifier (front half of the second combined identifier) and the rear identifier (rear half of the second combined identifier) while interchanging them. In the next step S46, the CPU 101 judges whether or not the second combined identifier made by the interchanging recombination coincides with the first combined identifier. The judgment on the coincidence is made similarly to the step S44. If the interchanged second combined identifier coincides with the first combined identifier (S46: YES), the CPU 101 judges that the specified second combined identifier is equivalent to the first combined identifier (S47). If the interchanged second combined identifier does not coincide with the first combined identifier (S46: NO), the CPU 101 judges that the specified second combined identifier is not equivalent to the first combined identifier (S48). After the equivalence judgment of S47 or S48, the CPU 101 returns to the step S42 to judge whether there exists another second combined identifier or not. The loop is repeated until there remains no second combined identifier for which the equivalence judgment has not been made yet (S42).

In this embodiment, the display of the management information on the display unit 108 of the management device 100 is only required to clearly indicate that the network interfaces transmitting combined identifiers judged to be equivalent are network interfaces of the same image formation device. Therefore, the display of the management information can also be made as shown in FIGS. 11A and 11B. In this example, the display of the management information is generally made by displaying only one network interface for each image formation device even if there exists an image formation device having two or more network interfaces (FIG. 11A). When a line displaying a network interface of an image formation device is clicked by the user, all the network interfaces of the image formation device are displayed (FIG. 11B). The above management information screen can also be configured to switch the network interface displayed in a line to another network interface in response to a mouse click on the line. The management information screen can include a scroll button to be clicked for switching the displayed network interface of each image formation device as shown in FIGS. 12A and 12B.

Figure 13:
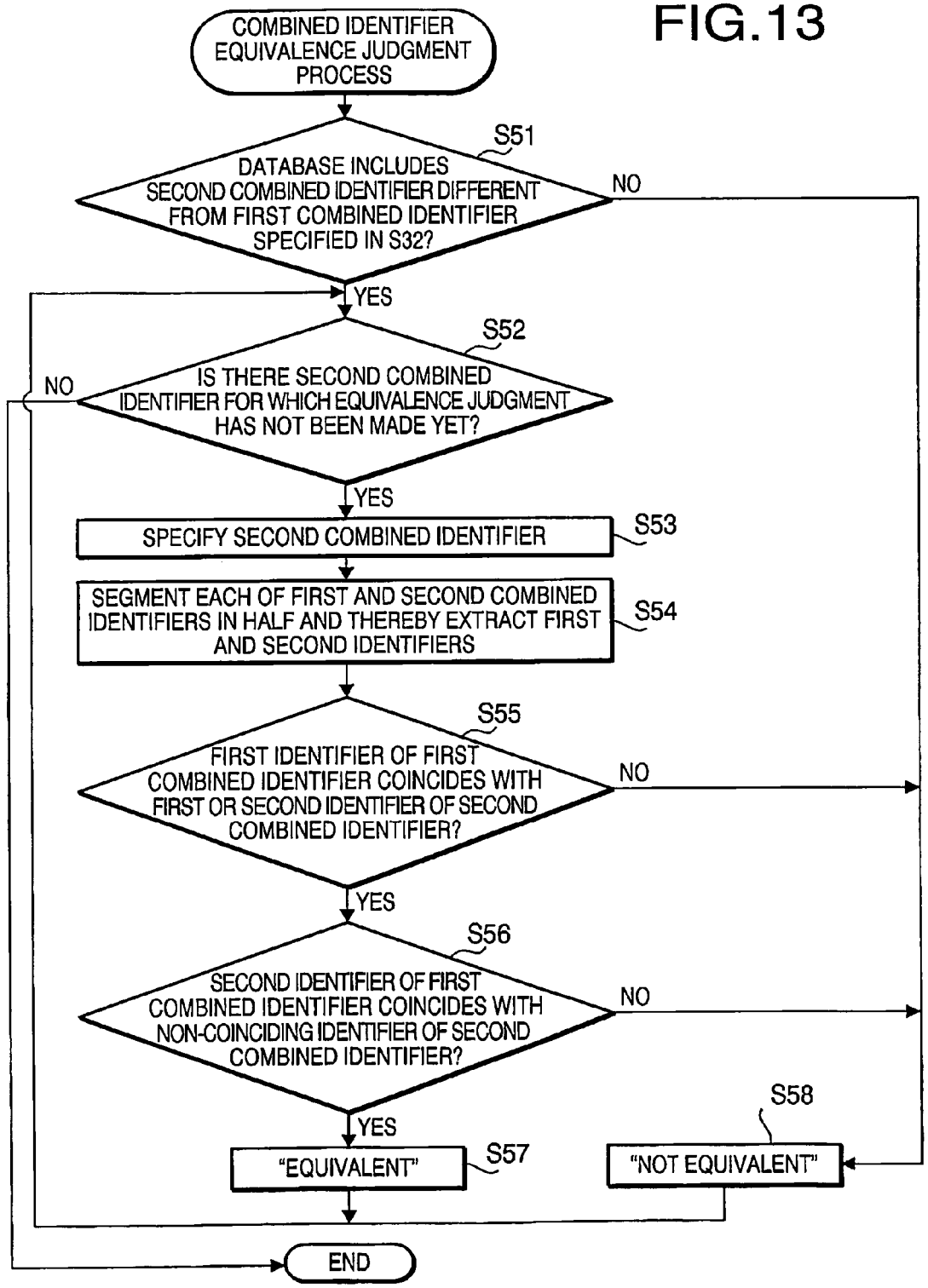
FIG. 13 is a flow chart showing another example of the flow of the combined identifier equivalence judgment program of the present invention.

The combined identifier equivalence judgment process implemented by the CPU 101 executing the combined identifier equivalence judgment program 104f in accordance with the present invention is not restricted to the aforementioned process of FIG. 7. For example, FIG. 13 shows another example of the flow of the combined identifier equivalence judgment program 104f. In the first step S51, the CPU 101 judges whether or not the database in the HDD 104 includes a combined identifier (second combined identifier) different from the combined identifier specified from the database in the step S32 (first combined identifier), similarly to the step S41 of FIG. 7. If the database includes no second combined identifier (S51: NO), the CPU 101 judges that no combined identifier equivalent to the first combined identifier exists in the database (S58) and thereafter advances to step S52. In this case, the combined identifier equivalence judgment program 104f of FIG. 13 is ended since the database includes no other second combined identifier (S52: NO). On the other hand, if the database includes a second combined identifier (S51: YES), the process advances to the step S52, in which the CPU 101 judges whether or not there exists a second combined identifier for which an equivalence judgment of steps S54-S58 has not been made yet. If there exists no such second combined identifier (S52: NO), the combined identifier equivalence judgment program 104f of FIG. 13 is ended. If there exists such a second combined identifier (S52: YES), the CPU 101 specifies a second combined identifier from the one or more second combined identifiers for which the equivalence judgment has not been made yet (S53) and segments each of the first and second combined identifiers in half into a first identifier and a second identifier (S54). In the next step S55, the CPU 101 judges whether or not the first identifier of the first combined identifier coincides with either the first or second identifier of the second combined identifier. If no coincidence is found (S55: NO), the CPU 101 judges that the specified second combined identifier is not equivalent to the first combined identifier (S58). If a coincidence is found (S55: YES), the process advances to step S56, in which the CPU 101 judges whether or not the second identifier of the first combined identifier coincides with the first or second identifier of the second combined identifier that did not coincide with the first identifier of the first combined identifier in the step S55. If the coincidence is found (S56: YES), the CPU 101 judges that the specified second combined identifier is equivalent to the first combined identifier (S57). If no coincidence is found (S56: NO), the CPU 101 judges that the specified second combined identifier is not equivalent to the first combined identifier (S58). In the equivalence judgment of S54-S58, each of the first and second combined identifiers is segmented in units of identifiers of single network interfaces, and two or more (two in this embodiment) combined identifiers are judged to be equivalent if the code sequence of each identifier obtained by the segmentation is common to the two or more combined identifiers.

In cases where MAC addresses are used as the identifiers as in this embodiment, the judgment of S56 does not result in "NO". Therefore, the step S56 can be left out as long as MAC addresses are used as the identifiers. The judgment of S56 can result in "NO" only when a particular identifier can be assigned to two or more devices.

When the combined identifier is generated by the method C shown in FIG. 9, the code arrangement of each identifier included in each of the first and second combined identifiers is restored according to the rule used for generating the combined identifiers, and the two combined identifiers (two pieces of identification information) are judged to be equivalent if the contents of each identifier obtained by the restoration are common to the two combined identifiers.

While the number of network interfaces of each image formation device has been assumed to be at most two in the network system 1 of this embodiment, the number of network interfaces can also be three or more. Even in such cases where each image formation device has three or more network interfaces, the image formation device in accordance with the present invention can generate each combined identifier by combining code sequences forming the identifiers according to a prescribed rule conserving the mathematical combination of the codes included in each identifier, and thus the management device can restore the identifiers from each combined identifier according to the rule of generating the combined identifiers and thereby make the judgment on the equivalence of combined identifiers with ease.

The management device in accordance with the present invention can also be connected to two or more networks to manage network interfaces on the two or more networks. FIG. 14 is a block diagram showing another example of a network system in accordance with the present invention, in which a management device is connected to two or more networks. In the example of FIG. 14, network interfaces 110 and 111 of the management device 1000 are connected to two networks 300 and 400, respectively, so that the management device 1000 can manage network interfaces of image formation devices 10a, 10b, 10c and 10d which are connected to the networks 300 and 400. The management device 1000 in this example is configured similarly to the management device 100 of the above embodiment except that the network interface 111 connected to the network 400 is provided in addition to the network interface 110. Each of the printers (image formation devices) 10a and 10c has two network interfaces 18 and 19 which are connected to different networks 300 and 400, respectively. In this case, the combined identifier transmitted by each network interface 18, 19 of the image formation device 10a or 10c includes identifiers of both the network interfaces 18 and 19. The combined identifiers from the network interfaces 18 and 19 are transmitted separately to the management device 1000 via different networks 300 and 400. Since the management device 1000 makes the equivalence judgment regarding all the combined identifiers received by the network interfaces 110 and 111, even combined identifiers received via different networks are handled as targets of the equivalence judgment. When two or more combined identifiers are judged to be equivalent by the equivalence judgment, the management device 1000 manages the network interfaces on the networks 300 and 400 while recognizing that the network interfaces transmitting the equivalent combined identifiers are those mounted on the same image formation device.

While a description has been given above of exemplary embodiments of the present invention, the present invention is not to be restricted by the particular illustrative embodiments and a variety of modifications, design changes, etc. are possible without departing from the scope and spirit of the present invention described in the appended claims. For example, the image formation device in accordance with the present invention is also applicable to terminal devices, electronic peripherals, etc. having network interfaces.

What is claimed is:

1. An image formation device having a first network interface assigned a first identification information, and a second network interface assigned a second identification information, comprising:
    a presence check request receiving unit which receives presence check requests, transmitted from a management device via a network, for a check on the presence or absence of each network interface on the network, with the first network interface and the second network interface, respectively;
    a combined identification information generating unit which generates a first combined identification information and a second combined identification information by combining an entirety of the first identification information and an entirety of the second identification information, respectively, an order of the first identification information and the second identification information included in the first combined identification information being different from an order of the first identification information and the second identification information included in the second combined identification information; and
    a combined identification information transmitting unit which transmits the first combined identification information from the first network interface and transmits the second combined identification information from the second network interface,
    wherein the first identification information and the second identification information, each are a series of codes of a fixed number of digits unique to each respective network interface.

2. The image formation device according to claim 1, wherein:
    the identification information assigned to each network interface is a series of codes of a fixed number of digits prescribed so that combination and order of the codes are unique to the network interface, and
    the combined identification information generating unit generates the combined identification information for each network interface by combining code sequences forming the multiple pieces of identification information assigned to the network interfaces according to a rule conserving a mathematical combination of the codes included in each piece of identification information.

3. The image formation device according to claim 2, wherein the combined identification information generating unit generates the combined identification information for each network interface by combining the code sequences forming the multiple pieces of identification information assigned to the network interfaces in series without segmenting each of the code sequences and without changing the order of the code sequences in each piece of identification information.

4. The image formation device according to claim 3, wherein the combined identification information generating unit generates the combined identification information for each network interface by combining the multiple pieces of identification information assigned to the network interfaces in series without segmenting each piece of identification information.

5. The image formation device according to claim 4, wherein the combined identification information generating unit generates the combined identification information for each network interface by combining the multiple pieces of identification information assigned to the network interfaces in series in a uniquely prescribed order.

6. The image formation device according to claim 2, wherein the combined identification information generating unit generates the combined identification information for each network interface by combining code sequences forming the multiple pieces of identification information assigned to the network interfaces while rearranging the code sequences according to a prescribed rule.

7. A management device which is connected to one or more image formation devices, each having a first network interface assigned a first identification information, and a second network interface assigned a second identification information via a network, comprising:
a presence check request transmitting unit which transmits presence check requests to the first network interface and the second network interface of the image formation devices, respectively, via the network;
a combined identification information receiving unit which receives a first combined identification information from the first network interface and a second combined identification information from the second network interface in response to the presence check requests, the first combined identification information and the second combined identification information being generated by combining an entirety of the first identification information and an entirety of the second identification information, respectively, an order of the first identification information
and the second identification information included in the first combined identification information being different from an order of the first identification information and the second identification information included in the second combined identification information;
a combined identification information equivalence judgment unit which makes a judgment on equivalence of the first combined identification information and the second combined identification information; and
a management unit which manages the first network interface and the second network interface as network interfaces belonging to the same image formation device when the first combined identification information and the second combined identification information are judged to be equivalent by the combined identification information equivalence judgment unit, wherein the first identification information and the second identification information, each are a series of codes of a fixed number of digits unique to each respective network interface.

8. The management device according to claim 7, further comprising a recognition result displaying unit which displays a result of recognition of the network interfaces based on the received combined identification information.

9. The management device according to claim 8, wherein the recognition result displaying unit selectively displays one of multiple pieces of recognition result information of the network interfaces whose combined identification information is judged to be equivalent by the combined identification information equivalence judgment unit.

10. The management device according to claim 9, wherein the recognition result displaying unit switchably displays one of the multiple pieces of recognition result information on the network interfaces whose combined identification information is judged to be equivalent by the combined identification information equivalence judgment unit in a display area for displaying only a piece of recognition result information.

11. The management device according to claim 7, wherein:
the identification information assigned to each network interface is a series of codes of a fixed number of digits prescribed so that a combination and order of the codes are unique to the network interface, and
the combined identification information received from each network interface is information generated by combining code sequences forming the multiple pieces of identification information assigned to the two or more network interfaces according to a rule conserving a mathematical combination of the codes included in each piece of identification information, and
the combined identification information equivalence judgment unit judges that multiple pieces of combined identification information are equivalent when the multiple pieces of combined identification information comprise the same combination of codes.

12. The management device according to claim 11, wherein:
the combined identification information received from each network interface is information generated by combining the code sequences forming the multiple pieces of identification information assigned to the two or more network interfaces in series without segmenting each of the code sequences and without changing the order of the code sequences in each piece of identification information, and
the combined identification information equivalence judgment unit judges that multiple pieces of combined identification information are equivalent if all the code sequences included in the combined identification information are common to the multiple pieces of combined identification information.

13. The management device according to claim 12, wherein:
the combined identification information received from each network interface is information generated by combining the multiple pieces of identification information assigned to the two or more network interfaces in series without segmenting each piece of identification information, and
the combined identification information equivalence judgment unit judges that multiple pieces of combined identification information are equivalent if all pieces of identification information included in the combined identification information are common to the multiple pieces of combined identification information.

14. The management device according to claim 13, wherein:
the combined identification information received from each network interface is information generated by combining the multiple pieces of identification information assigned to the two or more network interfaces in series in a uniquely prescribed order, and
the combined identification information equivalence judgment unit judges that multiple pieces of combined identification information are equivalent if a combination and order of the codes included in the combined identification information are common to the multiple pieces of combined identification information.

15. The management device according to claim 11, wherein:
the combined identification information received from each network interface is information generated by combining code sequences forming the multiple pieces of identification information assigned to the two or more network interfaces while rearranging the code sequences according to a prescribed rule, and
the combined identification information equivalence judgment unit restores each piece of identification information included in the combined identification information based on the prescribed rule and judges that multiple pieces of combined identification information are equivalent if all pieces of identification information obtained by the restoration are common to the multiple pieces of combined identification information.

16. A network system comprising:
one or more image formation devices each of which has at least one network interface; and
a management device which is connected to the one or more image formation devices via a network, wherein:
the one or more image formation devices include at least one image formation device having a first network interface assigned a first identification information, and a second network interface assigned a second identification information, the at least one image formation device comprising:
a presence check request receiving unit which receives presence check requests, transmitted from the management device via the network for a check on the presence or absence of each network interface on the network, with the first network interface and the second network interface, respectively;
a combined identification information generating unit which generates a first combined identification information and a second combined identification information by combining an entirety of the first identification information and an entirety of the second identification information, respectively, an order of the first identification information and the second identification information included in the first combined identification information being different from an order of the first identification information and the second identification information included in the second combined identification information; and
a combined identification information transmitting unit which transmits the combined identification information from the first network interface and transmits the second combined identification information from the second network interface and the management device comprising:
a presence check request transmitting unit which transmit the presence check requests to the first network interface and the second network interface of the at least one image formation device via the network;
a combined identification information receiving unit which receives a first combined identification information from the first network interface and a second combined identification information from the second network interface in response to the presence check requests;
a combined identification information equivalence judgment unit which makes a judgment on an equivalence of the first combined identification information and the second combined identification information; and
a management unit which manages the first network interface and the second network interface as network interfaces belonging to the same image formation device when the first combined identification information and the second combined identification information are judged to be equivalent by the combined identification information equivalence judgment unit,
wherein the first identification information and the second identification information, each are a series of codes of a fixed number of digits unique to each respective network interface.

17. A non-transitory computer readable medium having computer readable instructions stored thereon, which, when executed by a computer functioning as an image forming device having a first network interface assigned a first identification information, and a second network interface assigned a second identification information, cause the computer to:
receive presence check requests, transmitted from a management device via a network for a check on the presence or absence of each network interface on the network, with the first network interface and the second network interface, respectively;
generate a first combined identification information and a second combined identification information by combining an entirety of the first identification information and an entirety of the second identification information, respectively, an order of the first identification information and the second identification information included in the first combined identification information being different from an order of the first identification information and the second identification information included in the second combined identification information; and
transmit the first combined identification information from the first network interface and transmits the second combined identification information from the second network interface,
wherein the first identification information and the second identification information, each are a series of codes of a fixed number of digits unique to each respective network interface.

18. A non-transitory computer readable medium having computer readable instructions stored thereon, which, when executed by a computer functioning as a management device connected to one or more image formation devices, each having a first network interface assigned a first identification information, and a second network interface assigned a second identification information, cause the computer to:
transmit presence check requests to the first network interface and the second network interface of the image formation devices, respectively, via the network;
receive a first combined identification information from the first network interface and a second combined identification information from the second network interface in response to the presence check requests, the first combined identification information and the second combined identification information being generated by combining an entirety of the first identification information and an entirety of the second identification information, respectively, an order of the first identification information and the second identification information included in the first combined identification information being different from an order of the first identification information and the second identification information included in the second combined identification information;
make a judgment on an equivalence of the first combined identification information and the second combined identification information; and
manage the first network interface and the second network interface as network interfaces belonging to the same image formation device when the first combined identification information and the second combined identification information are judged to be equivalent, wherein the first identification information and the second identification information, each are a series of codes of a fixed number of digits unique to each respective network interface.

* * * * *